United States Patent [19]
Osterland

[11] Patent Number: 4,644,612
[45] Date of Patent: Feb. 24, 1987

[54] PANEL RETAINER

[75] Inventor: Robert W. Osterland, Marine City, Mich.

[73] Assignee: USM Corporation, Farmington, Conn.

[21] Appl. No.: 868,975

[22] Filed: May 30, 1986

[51] Int. Cl.⁴ .............................................. F16L 33/12
[52] U.S. Cl. ..................................... 24/295; 24/289; 24/293
[58] Field of Search ................ 24/295, 289, 293, 292, 24/294, 297, 351

[56] References Cited

U.S. PATENT DOCUMENTS

| | | | |
|---|---|---|---|
| 2,100,551 | 11/1937 | Reiter | 24/351 |
| 2,181,966 | 12/1939 | Dean | 24/295 |
| 2,188,026 | 1/1940 | Wiley | 24/293 |
| 2,499,637 | 3/1950 | Flora | 24/295 |
| 3,208,119 | 9/1965 | Seckerson | 24/295 |
| 3,310,929 | 3/1967 | Garvey | 24/295 |
| 4,043,579 | 8/1977 | Meyer | 24/293 |
| 4,402,118 | 9/1983 | Benedetti | 24/295 |

FOREIGN PATENT DOCUMENTS

| | | | |
|---|---|---|---|
| 886979 | 8/1953 | Fed. Rep. of Germany | 24/295 |
| 1093813 | 12/1967 | United Kingdom | 24/294 |

Primary Examiner—Victor N. Sakran
Attorney, Agent, or Firm—Aubrey C. Brine

[57] ABSTRACT

A resilient clip is provided for retaining a projection formed on a panel into an opening in a support structure. The clip has a "V" or "U" shaped lead portion provided with locking legs for retaining the projection in the lead portion and a pair of centrally located legs having locking shoulders for retaining the clip in the opening. The free ends of the centrally located locking legs have portions removed therefrom such that they are capable of being moved one past the other, when the locking shoulders are moved toward one another during entry of the fastener into the opening.

7 Claims, 5 Drawing Figures

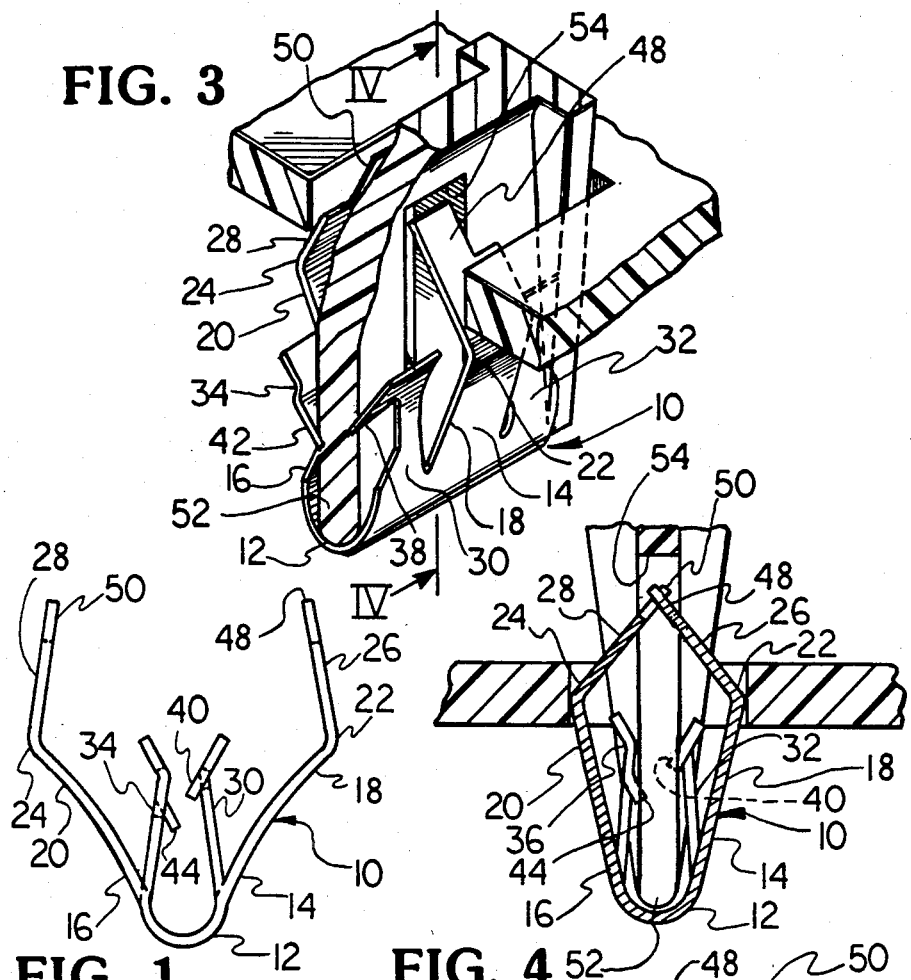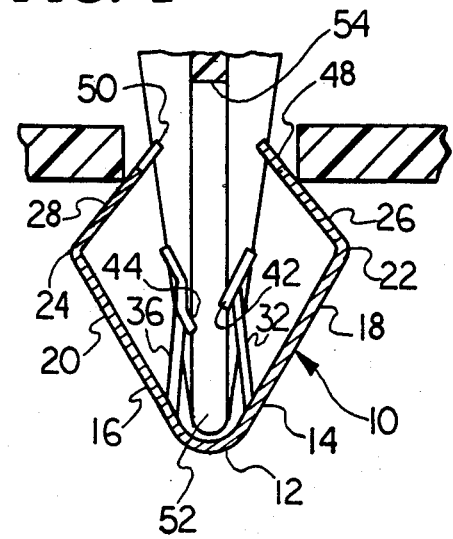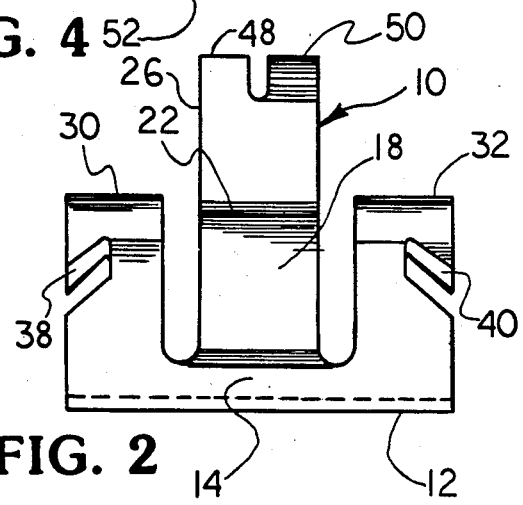

PANEL RETAINER

BACKGROUND OF THE INVENTION

The present invention relates to a resilient clip type fastener and more particularly to a resilient clip for retaining a projection formed in a panel into an opening in a support structure.

The prior art has disclosed devices adapted to force fit one part to another by means of clips having lockable tabs or other arrangement which provide attachment to one or both of the mating parts. These clips are generally made of spring steel and are useful in the environment for which they have been designed.

One clip of the type described is shown in U.S. Pat. No. 4,402,118 issued to Nicholas M. Benedetti and assigned to the assignee of the present invention. This clip is particularly adapted to the assembly of one part to another, wherein a projection on the one part is received in an opening or aperture in the second part. The type of clip disclosed has generally found acceptance in the assembly of parts wherein the part having the projection must be quickly assembled and disassembled, and provides a clip type fastener wherein the parts may be forced together to produce a snap fit, with the clip disposed in the opening.

In the clip disclosed in the above discussed reference, a pair of side members having locking shoulders are assembled over the ribs of a panel which is to be assembled on to a work piece. When the ribs are inserted into a slotted opening in the work piece, the locking shoulders are flexed but are controlled by the thickness of the rib onto which the clip is assembled due to the lead portions of the legs bearing against the opposite faces of the ribs. It has been found that when the ribs of the article to be assembled are molded too large (in the case of a plastic article), or the slot is too small, the locking shoulders are inhibited from flexing when entering the slotted opening and produce a situation where the rib could be damaged by attempting to force the clip into the slotted opening. On the other hand, should the slotted opening be too large, or the rib too small, a situation exists where the shoulders of the clip provide a loose fit in the slotted opening which results in a poor fitting assembly.

The present invention, therefore, has as an objective to provide a resilient clip for retaining a projection formed on a panel into an opening in a support structure which allows for variation in thickness of the projection formed on the panel, or in the slotted opening.

The invention further has as an object to provide a clip of the type disclosed which allows for easy assembly and disassembly of the panel onto a support structure wherein damage to either the panel or the support structure during assembly due to forcing the clip into the slotted opening, is minimized.

SUMMARY OF THE INVENTION

The above objects, and other objects which will become apparent as the description proceeds are achieved by providing a resilient clip for retaining a projection on a panel into an opening in a support, which comprises a pair of side members connected by a centrally disposed rounded main support member to form a substantially U or V shaped configuration to the clip. The side members comprise opposed elongated centrally located legs with rounded locking shoulders. Each of the side members further has substantially symmetrical opposed separate locking legs disposed adjacent the centrally located legs so that the locking legs of one side member oppose the locking legs of the other side member, each of the locking legs having locking tabs for locking against the sides of the projection in a loaded condition. The locking shoulders extend outwardly away from one another to lock against the sides of the opening in the support to retain the projection of the panel in the support, the centrally located leg members each having a free end opposite the rounded main support member. The free ends are disposed in facing relation to one another and have a portion removed therefrom such that the free ends move past one another when the locking shoulders are moved through the opening.

BRIEF DESCRIPTION OF THE DRAWING

For a more complete understanding of the invention, reference should be made to the accompanying description of a preferred embodiment taken in conjunction with the drawing wherein:

FIG. 1 is a side elevational view showing a resilient clip constructed in accordance with the teaching of the present invention;

FIG. 2 is a front elevational view of the clip of FIG. 1 showing further details of the clip;

FIG. 3 is a perspective view, partially in section, showing the clip of FIG. 1 and FIG. 2 during assembly onto a work piece;

FIG. 4 is a sectional view taken along the line IV—IV of FIG. 3 showing details of the assembly and the work piece; and FIG. 5 is a sectional view similar to FIG. 4 showing the clip of FIGS. 1 through 4 installed in a work piece.

DESCRIPTION OF THE PREFERRED EMBODIMENT

Referring to the drawing and in particular to FIGS. 1 and 2, there is shown a resilient clip 10 fabricated from sheet metal or other suitable material, comprising a rounded main support member 12 connecting a pair of side members 14 and 16 to form a substantially U or V shaped configuration to the clip. Each of the side members 14 and 16 comprise a centrally located leg 18 and 20 respectively, having a locking shoulder 22 and 24 and a free end 26 and 28.

The side members 14 and 16 further each comprise a pair of locking legs 30, 32 and 34, 36 respectively. The locking legs 30, 32 on side member 14 oppose the locking legs 34, 36 on side member 16 and each leg is provided with a locking tab in the form of tines 38, 40, 42 and 44. The tabs are disposed with the tines 38, 40, 42, 44 canted inwardly for grasping an article disposed therebetween.

Each of the free ends 26 and 28 are substantially rectangular in shape and have a rectangular portion removed from opposite facing sides to provide rectangular tabs 48 and 50. Each rectangular tab 48 and 50 is in facing relation with a cutout in the opposite free end such that the tabs do not contact, but are in side by side relation, when the legs 18 and 19 are forced toward one another as shown in FIG. 4 of the drawing.

In the present description, the preferred embodiment is shown employed in the attachment of a panel P onto a support member S. As will be noted, the panel P is provided with a projection 52 which is to be inserted into a rectangular opening in the support member S. It will further be observed that the projection 52 has a rectangular aperture 54 formed therein at the point to which the resilient clip 10 is to be applied.

Referring to FIG. 1, the clip 10 is shown in its relaxed position and when the projection 52 is inserted between the locking legs 30, 32, 34 and 36, only the locking legs contact the projection, the tines 38, 40, 42 and 44 projecting into the surface of the material to prevent removal of the clip 10 from the projection 52. The legs 18 and 20 and their free ends 26 and 28 do not come into contact with the projection 52, but extend a distance from the projection providing a great deal of latitude for movement of the locking shoulders 22 and 24. Referring now to FIG. 3, when the panel P is assembled to the support member S the locking shoulders 22 and 24 are forced through the opening in the support member S. The locking shoulders 22 and 24 are forced towards one another by contacting the opening in the support member S, however, the free ends 26 and 28 of the clip 10 do not contact the projection 52, but rather are received in the apparature 54, and the free ends move past one another, as shown in FIG. 3.

As best shown in FIG. 5, with the panel P assembled onto the support member S the legs 18 and 20 serve solely to retain the projection within the opening in the member S and do not contact the projection 52 which would cause a wedging action between the legs 18 and 20 of the clip and the projection 52. Thus when it is desired to remove the panel P from the support member S the free ends 26 and 28 of the clip are moved in the reverse direction and are free to assume the position shown in FIG. 4 while the panel is being removed from the support member. The function of the clip as shown in FIGS. 4 and 5 inhibits breakage of the clip and the projection, which could occur should the free ends of the clip be required to contact the panel projection during removal of the panel from the support member S.

From the foregoing, therefore, it is evident that the objectives of the invention are achieved by providing a fastener 10 wherein separate elements are employed to retain the clip onto the panel member, and to retain the assembled panel member and clip into an opening in a support structure. By providing the legs 18 and 20 in the structure which operate independently of any gripping action on the panel member, the clip may be used with a great number of variations in opening in the support member, and still serve to retain the panel onto the support. The independent deflection of the legs 18 and 20 also allows for easy removal of the panel from the support member without the risk of damage to the clip, or the panel projections.

I claim:

1. A resilient clip for retaining a projection on a panel into an opening in a support, comprising; a pair of side members connected by a centrally disposed rounded main support member to form a substantially "U" or "V" shaped configuration to the clip, said side members comprising opposed elongated centrally located legs with locking shoulders, each of said side members further has substantially symmetrical opposed separate locking legs disposed adjacent said centrally located legs so that the locking legs of one side member oppose the locking legs of the other side member, each of said locking legs having locking tabs for locking against the sides of the projection in the loaded condition, said locking shoulders extending outwardly away from one another to lock against the sides of the opening in the support to retain the projection of the panel in the support, said centrally located leg members each having a free end opposite said rounded main support member, said free ends being disposed in facing relation to one another and having a portion removed therefrom whereby said free ends move past one another when said locking shoulders are moved through said opening.

2. The resilient clip of claim 1 wherein said portions removed from said free ends are rectangular in cross-section.

3. The resilient clip of claim 1 wherein said free ends are rectangular and said portions removed therefrom comprise a rectangular cut-out at the side of each free end forming a rectangular tab in facing relation with a rectangular opening on each of said centrally located by free ends.

4. The resilient clip of claim 1 wherein each of said locking legs has a pair of locking tabs, one disposed adjacent said centrally located leg and one disposed at the opposite side of said locking leg.

5. The resilient clip of claim 1 wherein each of said locking leg tabs is disposed inwardly of a respective centrally located leg on the same side member of said clip.

6. The resilient clip of claim 5 wherein said portions removed from said free ends are rectangular in cross-section.

7. The resilient clip of claim 6 wherein the rectangular portions removed from said free ends comprise a cut-out at the side of each free end forming a rectangular tab in facing relation with the rectangular opening on each of said centrally located leg free ends.

* * * * *